United States Patent
Ogawa et al.

(10) Patent No.: US 9,621,079 B2
(45) Date of Patent: Apr. 11, 2017

(54) CONSTRUCTION MACHINE

(71) Applicant: HITACHI CONSTRUCTION MACHINERY CO., LTD., Tokyo (JP)

(72) Inventors: Takashi Ogawa, Tokyo (JP); Kohei Sakurai, Tokyo (JP); Yuichiro Morita, Hitachi (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 13 days.

(21) Appl. No.: 14/879,243

(22) Filed: Oct. 9, 2015

(65) Prior Publication Data

US 2016/0036358 A1 Feb. 4, 2016

Related U.S. Application Data

(63) Continuation of application No. 14/122,250, filed as application No. PCT/JP2012/063989 on May 30, 2012, now abandoned.

(30) Foreign Application Priority Data

Jun. 10, 2011 (JP) ................................. 2011-130630

(51) Int. Cl.
*H02P 6/06* (2006.01)
*H02P 3/18* (2006.01)
(Continued)

(52) U.S. Cl.
CPC ................ *H02P 3/04* (2013.01); *E02F 9/128* (2013.01); *E02F 9/2095* (2013.01); *E02F 9/267* (2013.01);
(Continued)

(58) Field of Classification Search
CPC ................ H02P 6/06; H02P 3/18; H02P 6/12
(Continued)

(56) References Cited

U.S. PATENT DOCUMENTS 5,862,301 A * 1/1999 Gontowski, Jr. ......... H02P 1/26
318/632
6,663,196 B1 * 12/2003 Mueller .................. B60T 8/172
303/144
(Continued)

FOREIGN PATENT DOCUMENTS

JP 2007-228721 A 9/2007
JP 2010-106511 A 5/2010
(Continued)

OTHER PUBLICATIONS

Machine translation JP 2007228721 A.

*Primary Examiner* — Kawing Chan
(74) *Attorney, Agent, or Firm* — Baker Botts L.L.P.

(57) ABSTRACT

A construction machine includes: a swing structure; an electric motor that drives the swing structure; an operating device that outputs an operating signal according to an operating amount and an operating direction; an inverter device that controls the electric motor based on a control signal generated based on the operating signal; a position sensor that detects an actual speed of the electric motor; and a second controller that determines whether at least one of a first condition and a second condition is satisfied. The first condition is satisfied when a sign of a value computed by subtracting the actual speed from a target speed of the electric motor that defined by the control signal; and the second condition is satisfied when a difference between the target speed and the actual speed is greater than a first reference value, and when the acceleration is greater than a second reference value.

5 Claims, 7 Drawing Sheets

(51) Int. Cl.
*H02P 6/12* (2006.01)
*H02P 3/04* (2006.01)
*E02F 9/20* (2006.01)
*G01P 3/44* (2006.01)
*E02F 9/12* (2006.01)
*E02F 9/26* (2006.01)
*H02P 29/024* (2016.01)

(52) U.S. Cl.
CPC ............... *G01P 3/44* (2013.01); *H02P 3/18* (2013.01); *H02P 6/06* (2013.01); *H02P 6/12* (2013.01); *H02P 29/0241* (2016.02); *B60L 2200/40* (2013.01); *Y02T 10/642* (2013.01)

(58) Field of Classification Search
USPC ........ 318/721, 720, 703, 700, 490, 461, 445
See application file for complete search history.

(56) References Cited

U.S. PATENT DOCUMENTS

| | | |
|---|---|---|
| 2007/0119163 A1 | 5/2007 | Tatsuno et al. |
| 2007/0277986 A1 | 12/2007 | Morinaga et al. |
| 2010/0100274 A1 | 4/2010 | Satake et al. |
| 2011/0029206 A1 | 2/2011 | Kang et al. |
| 2012/0259507 A1* | 10/2012 | Fink .................... B60C 23/0489 701/32.7 |
| 2012/0310473 A1* | 12/2012 | Yoshii .................... G01P 21/00 701/33.1 |
| 2013/0116892 A1* | 5/2013 | Wu ........................ B60R 25/09 701/45 |
| 2013/0261921 A1* | 10/2013 | Bando .................... G01C 21/28 701/70 |
| 2016/0053736 A1* | 2/2016 | Matsufuji ........... F02N 11/0818 701/112 |

FOREIGN PATENT DOCUMENTS

| | | | |
|---|---|---|---|
| JP | 2011-26948 A | 2/2011 | |
| SU | 1781393 A1 * | 12/1992 | |
| WO | WO 2011099133 A1 * | 8/2011 | .............. G01P 21/00 |

\* cited by examiner

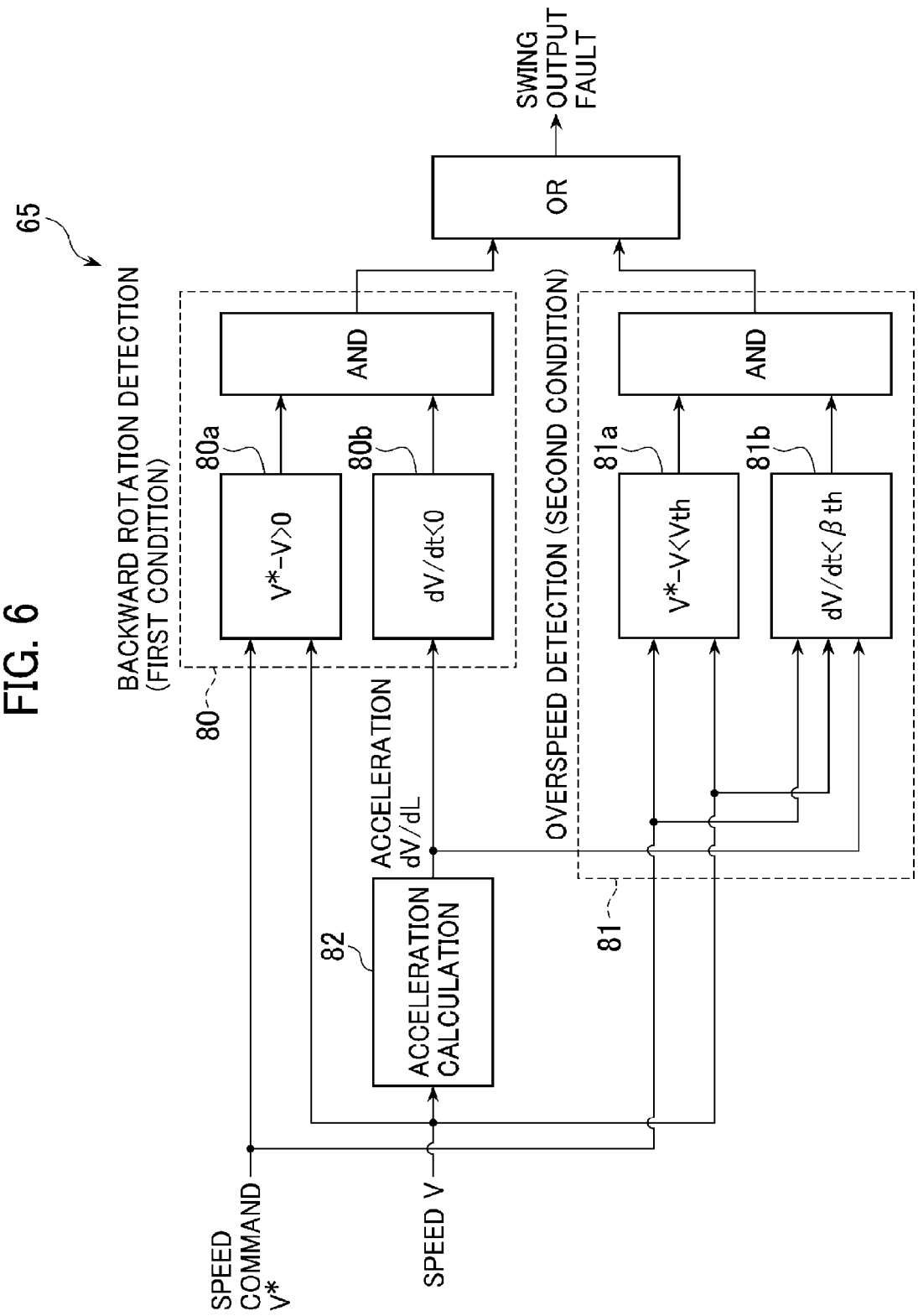

STOP→SWING
(NORMAL)

STOP→SWING
(FAULT)

SWINGING→STOP
(NEUTRAL LEVER, NORMAL)

SWINGING→STOP
(BACKWARD LEVER, NORMAL)

CONSTRUCTION MACHINE

CROSS REFERENCE TO PRIOR APPLICATIONS

This application is a continuation of, and claims the benefit of priority to, U.S. patent application Ser. No. 14/122,250, filed on Nov. 26, 2013, which, under 35 U.S.C. §371, is a U.S. National Stage entry of International Application No. PCT/JP2012/063989, which was filed on May 30, 2012, and which claims the benefit of priority to Japanese Patent Application No. 2011-130630, filed on Jun. 10, 2011. The International Application was published in Japanese on Dec. 13, 2012 as WO 2012/169413 A1 under PCT Article 21(2). The contents of the above applications are hereby incorporated by reference.

TECHNICAL FIELD

The present invention relates to a construction machine including an electric motor for driving a swing structure.

BACKGROUND ART

In recent years, more and more construction machines are electrified with the aim of, for example, improved engine fuel efficiency and reduced amounts of exhaust gases based on the techniques relating to hydraulic excavators. Examples of such construction machines include a hybrid construction machine that incorporates both a hydraulic actuator and an electric motor as actuators for driving different parts of the machine, in addition to an engine and an electric motor (a generator motor) as prime movers for a hydraulic pump. A known hybrid construction machine drives hydraulic actuators (hydraulic cylinders and hydraulic motors) to cause a work implement to perform work and a track structure to perform a traveling operation. It also drives an electric motor to cause a swing structure (e.g., an upper swing structure in a hydraulic excavator) to perform a swing operation.

The hybrid construction machine of the foregoing type may use a controller (e.g., an inverter device) for controlling the electric motor to achieve intended swing control by converting an operation amount of a swing operating lever operated by an operator to a corresponding electric signal and applying the electric signal to the controller. A fault that may occur in an electronic control system that includes a sensor for detecting a state of the electric motor (e.g., a magnetic pole position sensor of the electric motor), the controller, and the electric motor in a series of control processes, however, hampers correct swing control, resulting in a swing operation not intended by the operator being performed.

A known technique for avoiding such a situation as that described above uses a controller that monitors a difference between a speed command of an electric motor (a target speed) generated based on the operation amount of the swing operating lever and an actual speed of the electric motor and determines the operation to be a faulty operation when the difference falls outside a permissible range (see JP-A-2007-228721).

PRIOR ART DOCUMENT

Patent Document

Patent Document 1: JP-2007-228721-A

SUMMARY OF THE INVENTION

Problem to be Solved by the Invention

In a construction machine including a swing structure that has a large inertia, however, the speed command often differs widely from the actual speed. Use of only the magnitude of the difference between the speed command and the actual speed to determine whether a faulty operation occurs, as in the abovementioned related art, can cause inconveniences. Specifically, if the permissible range of the difference is set to be excessively small, a normal operation may be erroneously determined to be a faulty one, which may reduce work efficiency. By contrast, with a permissible range set to be excessively large, the controller can fail to detect a faulty operation, resulting in reduced reliability.

The present invention has been made in view of the foregoing situation and it is an object of the present invention to provide a construction machine that can prevent erroneous determination and failure of detection relating to determination of faults in an electronic control system.

Means for Solving the Problem

To achieve the foregoing object, an aspect of the present invention provides a construction machine comprising: a swing structure; an electric motor that drives the swing structure; an operating device that outputs an operating signal for operating the electric motor according to an operating amount and an operating direction; first control means that controls the electric motor based on a control signal generated based on the operating signal; detecting means that detects an actual speed of the electric motor; and second control means that determines whether at least one of a first condition and a second condition is satisfied, the first condition that is satisfied when a sign of a value computed by subtracting the actual speed from a target speed of the electric motor, the target speed defined by the control signal, is different from a sign of acceleration of the electric motor, and the second condition that is satisfied when a difference value between the target speed and the actual speed is greater than a first reference value and when the acceleration is greater than a second reference value.

Effects of the Invention

In the aspect of the present invention, erroneous determination and failure of detection relating to determination of faults in an electronic control system can be prevented and thus work efficiency and reliability can be enhanced.

BRIEF DESCRIPTION OF THE DRAWINGS

FIG. 6 is a block diagram showing a fault determining unit 65 according to the embodiment of the present invention.

MODES FOR CARRYING OUT THE INVENTION

Figure 1:
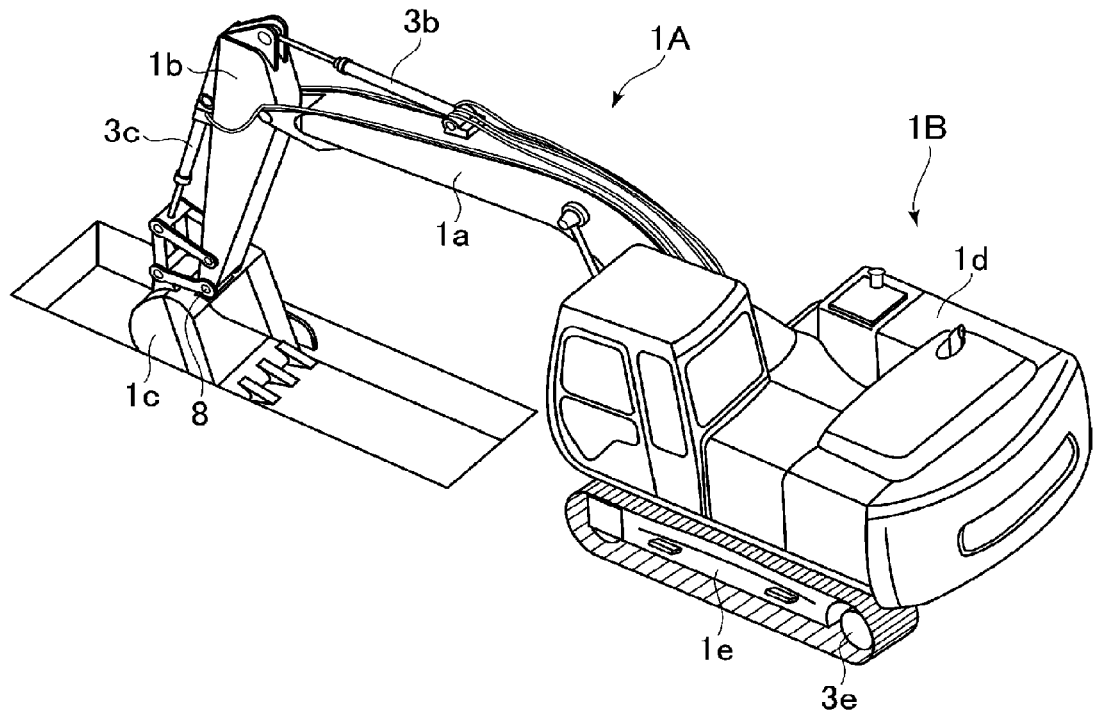
FIG. 1 is an illustration showing an appearance of a hybrid hydraulic excavator including a construction machine control system according to an embodiment of the present invention.

An embodiment of the present invention will be described below with reference to the accompanying drawings. It is noted that a first controller, a second controller, a first hydraulic sensor, and a second hydraulic sensor to be described hereunder may be denoted by controller 1, controller 2, hydraulic sensor 1, and hydraulic sensor 2, respectively, in the drawings.

FIG. 1 is an illustration showing an appearance of a hybrid hydraulic excavator including a construction machine control system according to the embodiment of the present invention. This hydraulic excavator shown in the figure includes an articulated work implement 1A and a vehicle body 1B. The work implement 1A includes a boom 1a, an arm 1b, and a bucket 1c. The vehicle body 1B includes an upper swing structure 1d and a lower track structure 1e.

The boom 1a is rotatably supported by the upper swing structure 1d and driven by a hydraulic cylinder (boom cylinder) 3a. The arm 1b is rotatably supported by the boom 1a and driven by a hydraulic cylinder (arm cylinder) 3b. The bucket 1c is rotatably supported by the arm 1b and driven by a hydraulic cylinder (bucket cylinder) 3c. The upper swing structure 1d is swingably driven by an electric motor (swing motor) 16 (see FIG. 3). The lower track structure 1e is driven by left and right track motors (hydraulic motors) 3e and 3f (see FIG. 3). The hydraulic cylinder 3a, the hydraulic cylinder 3b, the hydraulic cylinder 3c, and the electric motor 16 are controlled for driving by operating devices 4a and 4b (see FIG. 3) disposed in a cab of the upper swing structure 1d, the operating devices 4a, 4b outputting hydraulic operating signals.

Figure 2:
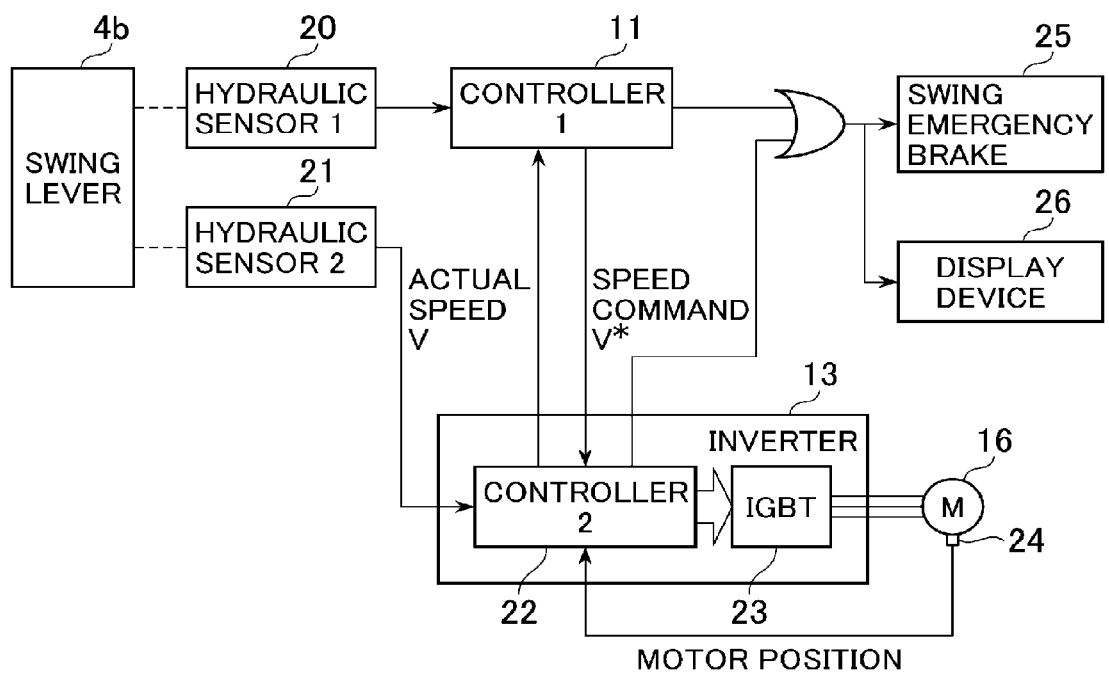
FIG. 2 is a configuration diagram showing the construction machine control system according to the embodiment of the present invention.

FIG. 2 is a configuration diagram showing the construction machine control system according to the embodiment of the present invention. The system shown in the figure includes the electric motor 16, a position sensor (e.g., magnetic pole position sensor) 24, the operating device (swing operating lever) 4b, a first hydraulic sensor 20, a second hydraulic sensor 21, a first controller 11, an inverter device (electric power conversion device) 13, and a swing emergency brake 25. Specifically, the electric motor 16 drives the upper swing structure 1d. The position sensor 24 detects a rotational position of the electric motor 16. The operating device 4b outputs a hydraulic operating signal (pilot pressure) for a swing motion of the upper swing structure 1d according to an amount through which the operating device 4b is operated (operating amount) and a direction in which the operating device 4b is operated (operating direction). The first hydraulic sensor 20 and the second hydraulic sensor 21 each detect pressure corresponding to the hydraulic operating signal output from the operating device 4b and output an electric operating signal corresponding to the pressure. The first controller 11 calculates a target speed V* of the electric motor 16 based on the electric operating signal output from the first hydraulic sensor 20 and an actual speed V (that may be calculated, for example, from the rotational position detected by the position sensor 24) of the electric motor 16 and outputs a control signal (speed command) according to the target speed V*. The inverter device 13 controls the electric motor 16 based on the control signal (speed command) output from the first controller 11. The swing emergency brake 25 brakes the upper swing structure 1d based on a braking signal output from the first controller 11 or the inverter device 13.

The inverter device (electric power conversion device) 13 is connected to an electric energy storage device 15 (see FIG. 3), such as a battery. Converting direct current (DC) power charged in the electric energy storage device 15 into alternating current (AC) power (three-phase AC) through switching, the inverter device 13 supplies the AC power to the electric motor 16 to thereby control the electric motor 16. The inverter device 13 includes an inverter circuit, a driver circuit, and a second controller (control circuit) 22. The inverter circuit includes a switching device (e.g., an insulated gate bipolar transistor (IGBT)). The driver circuit controls driving of the inverter circuit. The second controller 22 outputs a control signal (torque command) to the driver circuit to thereby control to turn on and off the switching device in the inverter circuit. It is noted that, in the accompanying drawings, the inverter circuit and the driver circuit in the inverter device 13 are denoted by "IGBT" as an exemplary switching device. Thus, in the following, IGBT 23 represents both the inverter circuit and the driver circuit.

The first hydraulic sensor 20 and the second hydraulic sensor 21 may be each configured as a set of two hydraulic sensors for individually detecting a clockwise swing and a counterclockwise swing of the upper swing structure 1d as will be described later. FIG. 2, however, simply shows one hydraulic sensor each. In addition, in the embodiment, the pilot pressure (hydraulic operating signal) output from the operating device 4b is detected by the first hydraulic sensors 20 and 21 for conversion into a corresponding electric signal. An arrangement may nonetheless be made in which the electric operating signal according to the operating direction and the operating amount of the operating device 4b is directly output. In this case, a position sensor that detects rotational displacement of the operating lever in the operating device 4b (e.g., a rotary encoder) may be used. Additionally, in the embodiment, the operating device 4b has two hydraulic sensors 20 and 21. Sensors operating on different detection schemes may nonetheless be combined together; for example, a combination of the hydraulic sensor and the position sensor. This can enhance reliability of the system.

The electric operating signal output from the first hydraulic sensor 20 is applied to the first controller 11. The electric operating signal output from the second hydraulic sensor 21 is applied to the second controller 22 disposed in the inverter device 13.

The first controller 11 calculates the target speed V* of the electric motor 16 based on the electric operating signal output from the first hydraulic sensor 20 and the actual rotational speed (actual speed V) of the electric motor 16 applied via the second controller 22. The first controller 11 then outputs a control signal (speed command) corresponding to the target speed V* to the second controller 22.

The second controller 22 outputs a torque command (control signal) generated in consideration of the speed command (control signal) applied thereto from the first controller 11, a torque limit defined by, for example, device performance restrictions (e.g., pressing force, electricity, DC line voltage), the rotational position (actual speed V) of the electric motor 16 detected by the position sensor 24, and a current value (actual current) detected by a three-phase motor current sensor 30. The second controller 22 then turns on or off the IGBT 23 based on the torque command, thereby controlling the electric motor 16 (see FIG. 5). Additionally, the second controller 22 calculates the actual speed V of the electric motor 16 using the rotational position of the electric motor 16 detected by the position sensor 24 and outputs the calculated actual speed V (produces a feedback output) to the first controller 11.

It is noted that, in the embodiment, the speed command is output as a command value from the first controller 11; however, a swing torque command may be used instead. In this case, the second controller 22 is to produce a feedback output of the actual torque value of the electric motor 16 to the first controller 11.

A hydraulic brake may, for example, be used for the swing emergency brake (braking device) 25. The hydraulic brake includes a plurality of discs pressed by brake shoe springs. The brake is released when hydraulic pressure for releasing the brake is applied and the hydraulic pressure overcomes a force of the springs.

Figure 3:
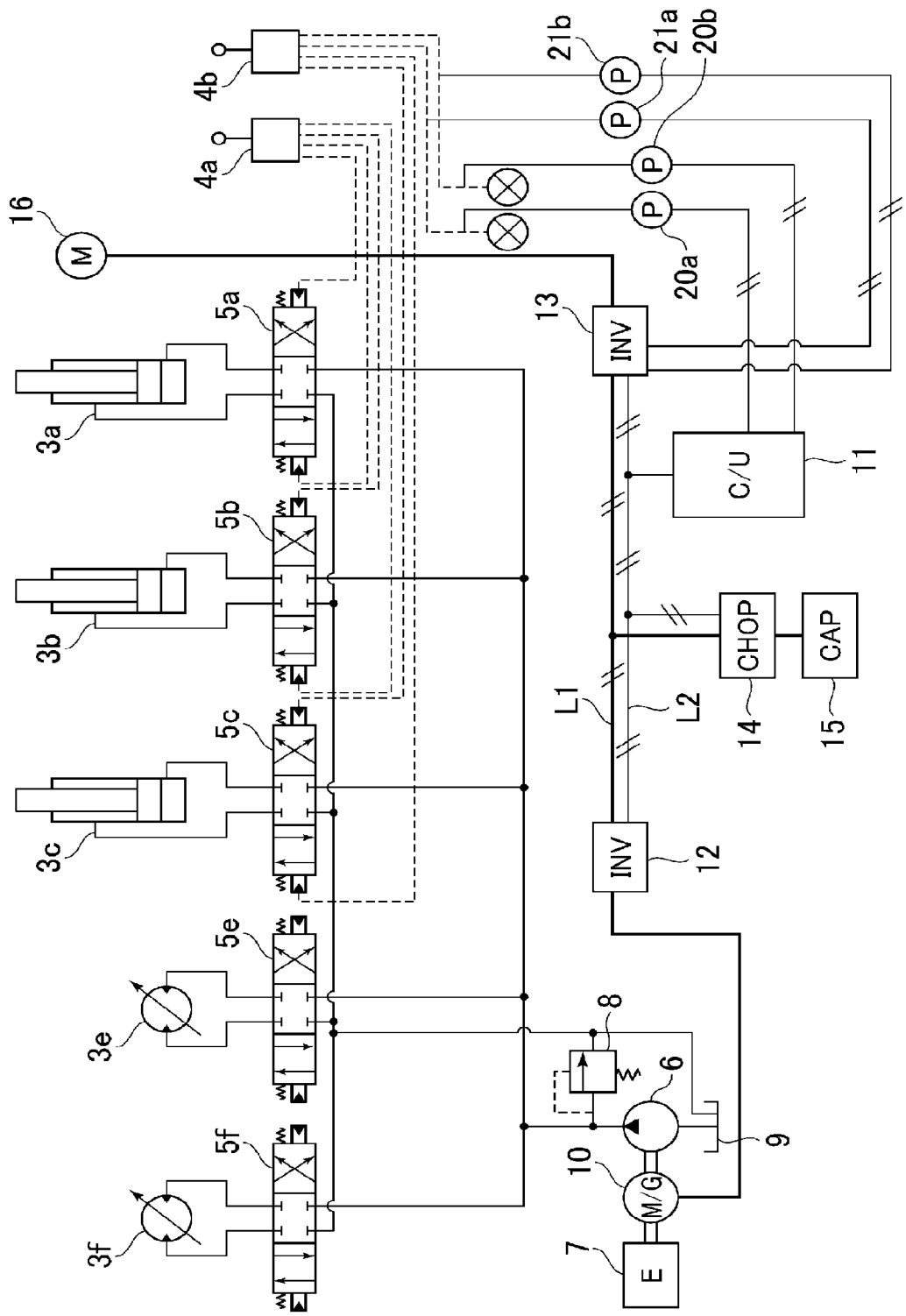
FIG. 3 is a diagram showing an exemplary application of the construction machine control system according to the embodiment of the present invention to a specific construction machine.

FIG. 3 is a diagram showing an exemplary application of the construction machine control system according to the embodiment of the present invention to a specific construction machine. In FIG. 3, like or corresponding parts are identified by the same reference numerals as used in the preceding figures and descriptions for those parts may not be duplicated (this applies to each of the subsequent figures).

In FIG. 3, the operating devices 4a and 4b each include an operating lever and generate a pilot pressure according to the operating direction and the operating amount of the operating lever operated by an operator. The pilot pressure is generated by a primary pressure generated in a pilot pump (not shown) being reduced to a secondary pressure according to the operating amount of the operating devices 4a and 4b. The pilot pressure defined according to the operating amount of the operating device 4a is sent to a pressure receiving part of each of spool type directional control valves 5a to 5f. This causes the directional control valves 5a to 5f to change their positions from the neutral positions shown in the figure. The directional control valves 5a to 5f change the direction of flow of hydraulic fluid generated from a hydraulic pump 6 powered by an engine 7 to thereby control driving of hydraulic actuators 3a to 3f. Should pressure inside a hydraulic line rise inordinately, the hydraulic fluid is released to a tank 9 via a relief valve 8. The hydraulic actuators 3a to 3c serve as the hydraulic cylinders that drive the boom 1a, the arm 1b, and the bucket 1c, respectively. The hydraulic actuators 3e and 3f serve as hydraulic motors that drive the left and right track devices disposed at the lower track structure 1e.

A driving power conversion machine (generator motor) 10 is connected between the hydraulic pump 6 and the engine 7. The driving power conversion machine 10 functions as both a generator and a motor. As the generator, the driving power conversion machine 10 converts driving power of the engine 7 to electric energy and outputs the electric energy to inverter devices 12 and 13. As the motor, the driving power conversion machine 10 uses electric energy supplied from the electric energy storage device 15 to assist in driving the hydraulic pump 6. The inverter device 12 converts electric energy of the electric energy storage device 15 to AC electric power and supplies the AC electric power to the driving power conversion machine 10 to assist in driving the hydraulic pump 6.

The inverter device 13 supplies electric power output from the driving power conversion machine 10 or the electric energy storage device 15 to the electric motor 16 and corresponds to the inverter device 13 shown in FIG. 2. Thus, the inverter device 13 includes the second controller 22 shown in FIG. 2. With an input of a speed command (control signal) received from the first controller 11, the inverter device 13 controls driving of the electric motor 16. The inverter device 13 also determines whether a fault occurs in an electronic control system (the electric motor 16, the position sensor 24, and the inverter device 13) relating to the electric motor 16 based on the target speed V* defined by the speed command output from the first controller 11, the actual speed V of the electric motor 16 calculated from a detected value of the position sensor 24, and acceleration dV/dt that is a change with time of the actual speed V of the electric motor 16. The second hydraulic sensors 21 (21a, 21b) are disposed in, out of pilot lines connecting between the operating devices 4a and 4b and the directional control valves 5a to 5f, two pilot lines that control swing motions of the upper swing structure 1d in clockwise and counterclockwise directions.

A chopper 14 controls voltage of a DC electric power line L1. The electric energy storage device 15 supplies electric power to the inverter devices 12 and 13 via the chopper 14 and stores electric energy generated by the driving power conversion machine 10 and electric energy regenerated from the electric motor 16. A capacitor, a battery, or both may be used for the electric energy storage device 15.

The first controller 11 calculates the target speed V* of the electric motor 16 based on electric operating signals input from the first hydraulic sensors 20 (20a, 20b) connected, respectively, to, out of the pilot lines connecting between the operating devices 4a and 4b and the directional control valves 5a to 5f, two pilot lines that control the swing motions of the upper swing structure 1d in the clockwise and counterclockwise directions. The first controller 11 then outputs a control signal (swing operating command) according to the calculated target speed V* to the inverter device 13. Additionally, the first controller 11 performs driving power regenerative control that recovers electric energy from the electric motor 16 during swing braking. Furthermore, during the driving power regenerative control and when excess electric power is produced under light hydraulic load, the first controller 11 performs control to store the recovered electric power and excess electric power in the electric energy storage device 15.

The inverter devices 12, 13, the chopper 14, and the first controller 11 transmit and receive signals required for the control via a communication line L2.

Figure 4:
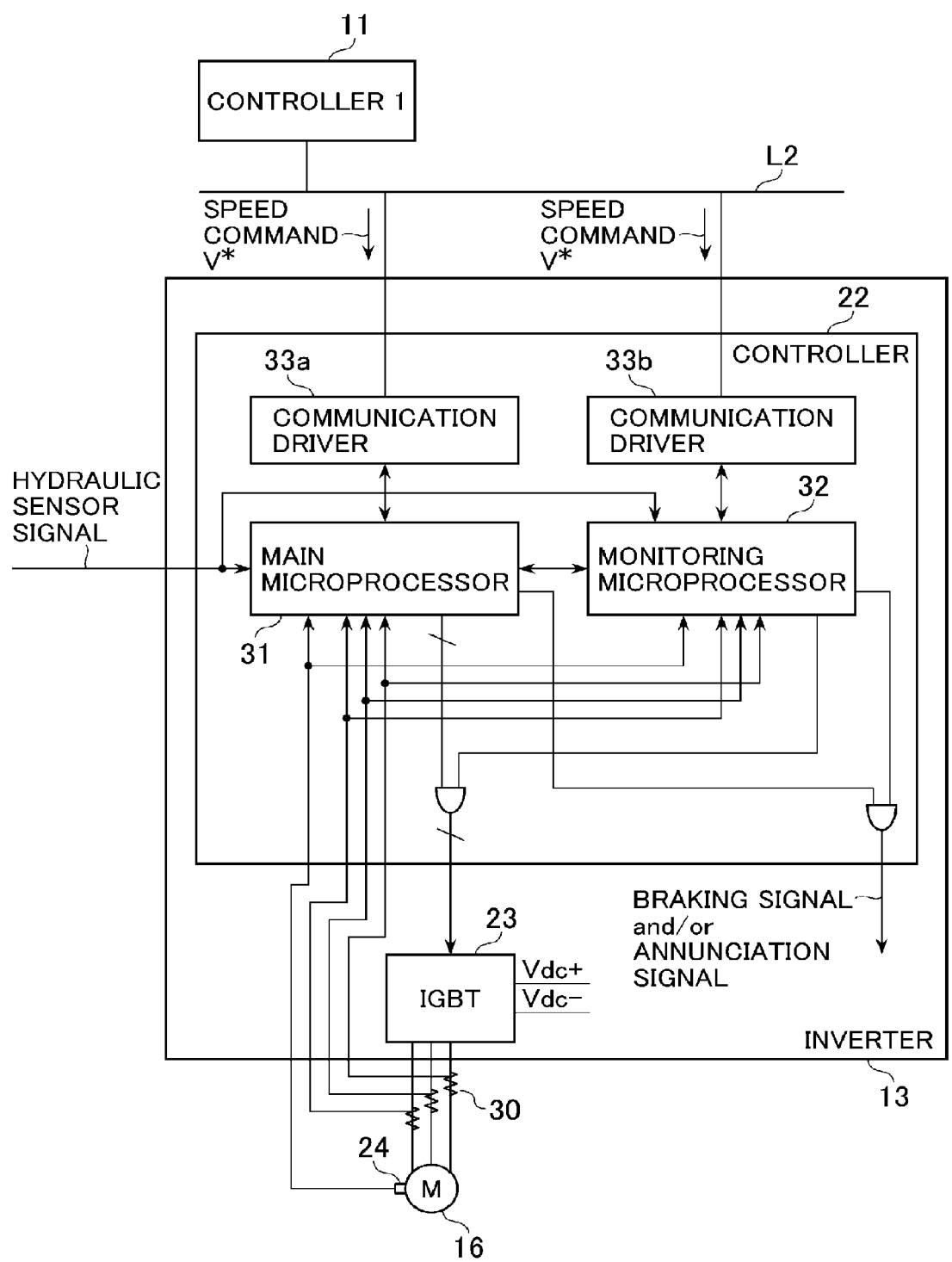
FIG. 4 is a schematic diagram showing a hardware configuration of an inverter device 13 and its surrounding components according to the embodiment of the present invention.

FIG. 4 is a schematic diagram showing a hardware configuration of the inverter device 13 and its surrounding components according to the embodiment of the present invention. As shown in FIG. 4, the second controller 22 includes a main microprocessor (first microprocessor) 31 and a monitoring microprocessor (second microprocessor) 32 as control units. The main microprocessor 31 and the monitoring microprocessor 32 are control units independent of each other. Communication drivers 33a and 33b are connected to the main microprocessor 31 and the monitoring microprocessor 32, respectively, each assuming an interface between the corresponding microprocessor 31 or 32 and the communication line L2.

The main microprocessor 31 receives inputs of a speed command input from the first controller 11 via the communication driver 33a, an electric operating signal output from the second hydraulic sensor 21, rotational position information of the electric motor 16 output from the position sensor 24, and actual current information output from the current sensor 30. Using the information from the position sensor 24 and the current sensor 30, the main microprocessor 31 outputs a gate control signal to the IGBT 23 so as to satisfy the speed command input from the first controller 11 by way of the communication line L2.

The monitoring microprocessor 32 receives inputs of a speed command input from the first controller 11 via the communication driver 33b, an electric operating signal output from the second hydraulic sensor 21, rotational position information of the electric motor 16 output from the position sensor 24, and current information output from the current sensor 30. The monitoring microprocessor 32 performs a process of determining whether a fault exists in the electronic control system relating to the electric motor 16 based on the target speed V* of the electric motor 16 defined by the speed command, the actual speed V of the electric motor 16 calculated from the rotational position information from the position sensor 24, and the acceleration dV/dt that is a change with time of the actual speed V of the electric motor 16.

Figure 5:
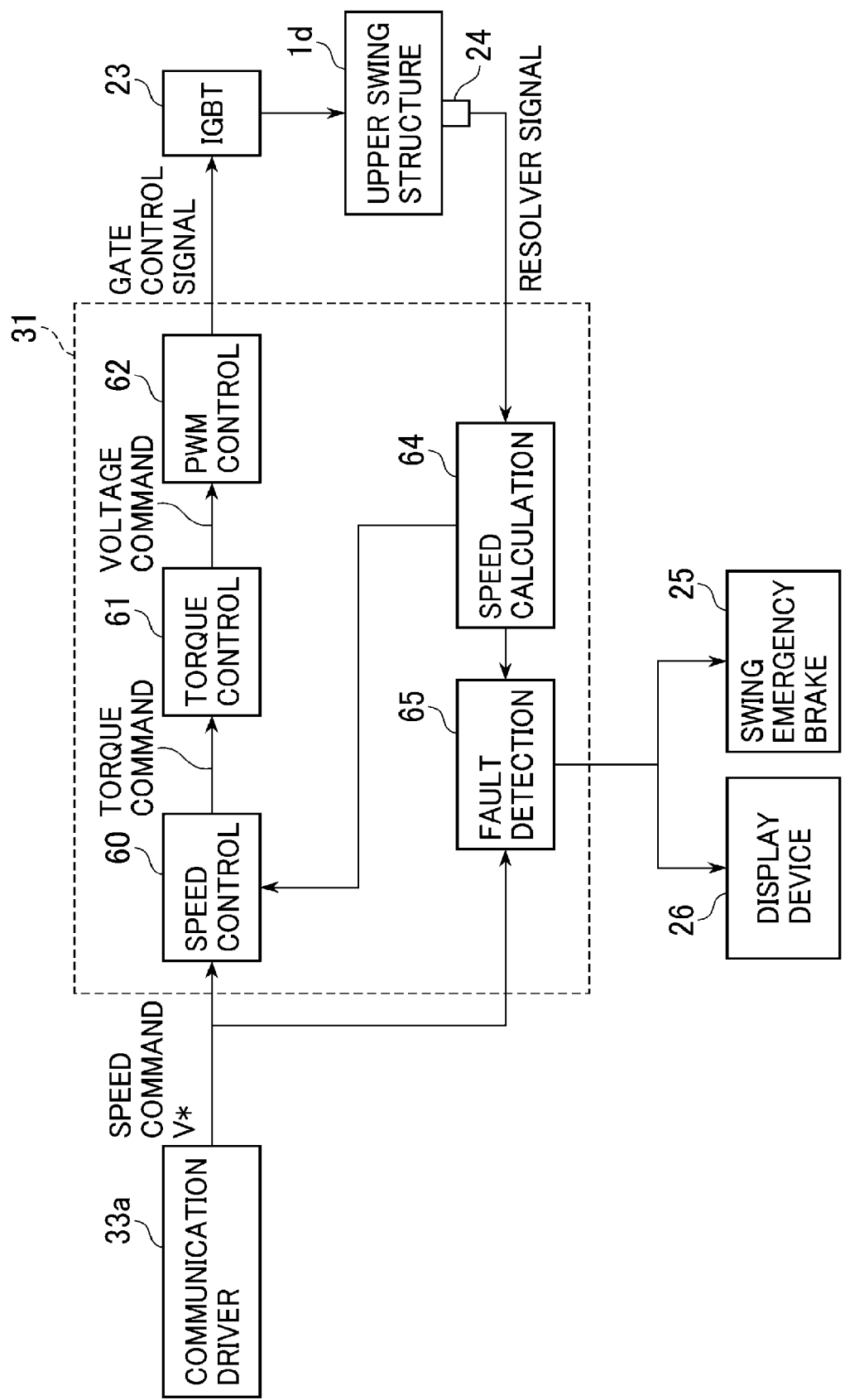
FIG. 5 is a functional block diagram showing a main microprocessor 31 according to the embodiment of the present invention.

FIG. 5 is a functional block diagram showing the main microprocessor 31 according to the embodiment of the present invention. As shown in FIG. 5, the main microprocessor 31 includes a speed control unit 60, a torque control unit 61, a PWM control unit 62, a speed calculating unit 64, and a fault determining unit 65. The main microprocessor 31 controls the speed of the electric motor 16 through feedback control.

The speed control unit 60 generates a torque command intended for the torque control unit 61 so that the actual speed V calculated by the speed calculating unit 64 follows the speed command (target speed V*).

The torque control unit 61 generates a voltage command so that actual torque follows the torque command generated by the speed control unit 60. In addition, if the electric motor 16 cannot be made to follow the torque command output from the speed control unit 60 due to, for example, device performance restrictions relating to the hydraulic excavator, the torque control unit 61 limits the torque command (specifically, reduces as necessary the torque command output from the speed control unit 60).

The PWM control unit 62 generates a gate control signal through pulse width modulation (PWM).

The torque command generated by the speed control unit 60 is converted to a voltage command based on a correction made by the torque control unit 61. The voltage command generated by the torque control unit 61 is output to the PWM control unit 62 and converted to a gate control signal. The gate control signal generated by the PWM control unit 62 is output to the IGBT 23. It is noted that, in this embodiment, torque of the electric motor 16 is controlled by feedback control that causes the actual current of the current sensor 30 to follow a current command corresponding to the torque command.

The speed calculating unit 64 calculates the actual speed V of the upper swing structure 1d. The speed calculating unit 64 receives an input of rotational position information (resolver signal) of the electric motor 16 output from the position sensor 24 and, based on the rotational position information, calculates the actual speed V.

The fault determining unit 65 determines whether a fault occurs in the electronic control system (performs a fault determining process) using the speed command V* received from the first controller 11 via the communication driver 33a and the actual speed V calculated by the speed calculating unit 64. The fault determining process performed by the fault determining unit 65 will be described in detail using a relevant figure.

FIG. 6 is a block diagram showing the fault determining unit 65 according to the embodiment of the present invention. As shown in FIG. 6, the fault determining unit 65 includes an acceleration calculating unit 82, a backward rotation detecting unit 80, and an overspeed detecting unit 81.

The acceleration calculating unit 82 receives an input of the actual speed V calculated by the speed calculating unit 64. The acceleration calculating unit 82 calculates the acceleration dV/dt using the actual speed V input thereto and outputs the calculated acceleration dV/dt to the backward rotation detecting unit 80 and the overspeed detecting unit 81. It is noted that the embodiment is configured so that the acceleration dV/dt is calculated from the actual speed V when the acceleration of the electric motor 16 is calculated. The acceleration dV/dt may nonetheless be calculated from the torque command (target torque) output from the electric motor 16 or the actual torque generated by the electric motor 16 (that is calculated from the output of the current sensor 30). Alternatively, instead of the foregoing, an acceleration detector, such as acceleration sensors and gyro sensors, may be installed and the output from the acceleration detector is used.

The backward rotation detecting unit 80 receives inputs of a speed command (target speed V*) output from the first controller 11, the actual speed V calculated by the speed calculating unit 64, and the acceleration dV/dt calculated by the acceleration calculating unit 82. The backward rotation detecting unit 80 determines whether a condition (a first condition) is satisfied or not, which is satisfied when a sign of a value computed by subtracting the actual speed V from the target speed V* (value of a difference in speed) is different from a sign of the acceleration dV/dt. Based on this determination, the backward rotation detecting unit 80 determines whether the electric motor 16 rotates backward as against an instruction of the operator. The example shown in the figure represents a case in which the sign of the value of the target speed V* from which the actual speed V is subtracted is detected to be "positive" and the sign of the acceleration dV/dt is detected to be "negative."

The overspeed detecting unit 81 receives inputs of a speed command (target speed V*) output from the first controller 11, the actual speed V calculated by the speed calculating unit 64, and the acceleration dV/dt calculated by the acceleration calculating unit 82. The overspeed detecting unit 81 determines whether a condition (a second condition) is satisfied or not, which is satisfied when a difference value between the target speed V* and the actual speed V is greater than a reference value Vth (a first reference value) and when the acceleration is greater than a reference value βth (a second reference value). Based on this determination, the overspeed detecting unit 81 determines whether the rotational speed of the electric motor 16 is excessively high as against an instruction of the operator. Considering the magnitude of the acceleration in addition to the magnitude of the speed difference enables the following determination to be made: specifically, when the acceleration is smaller than the second reference value βth even with the speed difference being so considerable as to exceed the first reference value Vth, the considerable speed difference is attributable to inertia of the upper swing structure 1d and the condition can be determined to be normal. Thus, the inertia of the upper swing structure 1d can be taken into consideration, so that the likelihood of occurrence of erroneous determination and failure of detection can be reduced as compared with a case in which focus is placed only on the speed difference.

If at least one of the first condition and the second condition is satisfied in the backward rotation detecting unit 80 or the overspeed detecting unit 81, the fault determining unit 65 determines that a fault (e.g., a faulty IGBT 23 or electric motor 16, or a fault in parts other than the swing control system) has occurred in the electronic control system relating to the electric motor 16. The fault determining unit 65 according to the embodiment, upon determining that a fault has occurred as described above, outputs a gate off signal to the IGBT 23 to set the electric motor 16 in a free run state before outputting a braking signal to the swing emergency brake 25 to brake the electric motor 16. Operating the swing emergency brake 25 as described above allows the electric motor 16 to be braked even when the braking cannot be applied through a control approach by outputting a zero speed command to the inverter device 13 (specifically, causing the inverter device 13 to apply a voltage that results in the electric motor 16 generating deceleration torque).

An arrangement may even be made in which an annunciating device that annunciates occurrence of a fault in the hydraulic excavator based on an annunciation signal is connected to the fault determining unit 65; when at least one of the first condition and the second condition is satisfied, as in the above-described case, an annunciation signal instead of, or together with, the braking signal is output to the annunciating device, so that the operator or a supervisor may be advised that a fault has occurred. Nonlimiting examples of the annunciating device include a display device 26 (see FIG. 2) disposed near a operator's seat in the cabin in the hydraulic excavator, a warning light, and an alarm. In this case, the display device 26 may display a message prompting inspection or repair of devices, in addition to the message indicating that a fault has occurred.

Figure 7A:
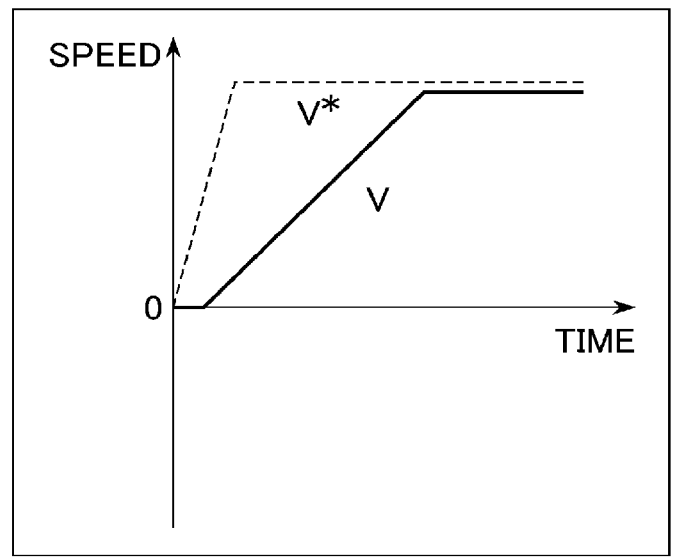
FIG. 7A is a graph showing an exemplary relation between a speed command V* and an actual speed V.
Figure 7B:
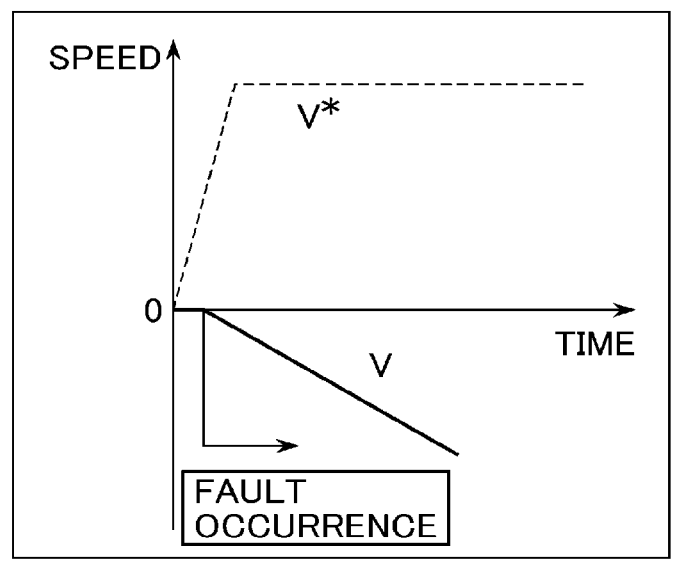
FIG. 7B is a graph showing an exemplary relation between the speed command V* and the actual speed V.

The fault determining process performed in the hydraulic excavator having the arrangements as described above will be exemplarily described below. FIGS. 7A, 7B, 7C, and 7D are graphs showing exemplary relations between the speed command V* and the actual speed V. Of these, FIGS. 7A and 7B show operations from stop to swing. In FIG. 7A, the electric motor 16 is accelerated normally; and neither the first condition nor the second condition is satisfied, so that the fault determining unit 65 does not determine a fault. FIG. 7B shows a case in which the electric motor 16 rotates backward against the intention of the operator. In this case, the sign of the value of the target speed V* from which the actual speed V is subtracted is "positive" and the sign of the acceleration dV/dt is "negative." Thus, at least the first condition is satisfied and a fault can be determined to have occurred, so that the fault determining unit 65 outputs a braking signal to the swing emergency brake 25.

Figure 7C:
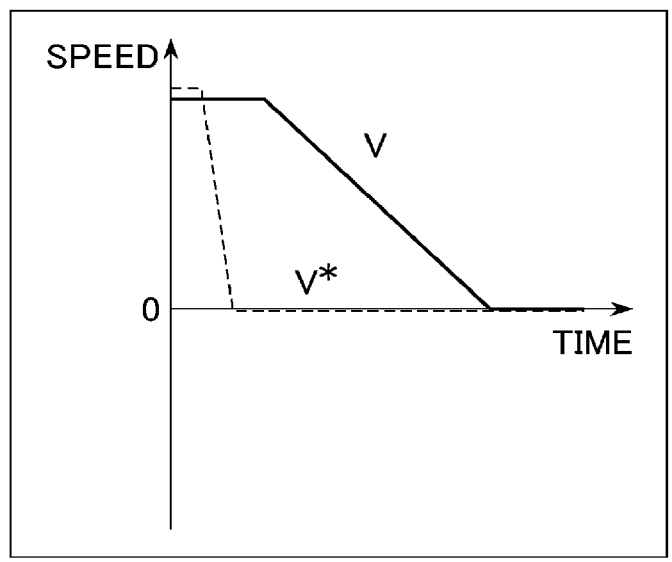
FIG. 7C is a graph showing an exemplary relation between the speed command V* and the actual speed V.
Figure 7D:
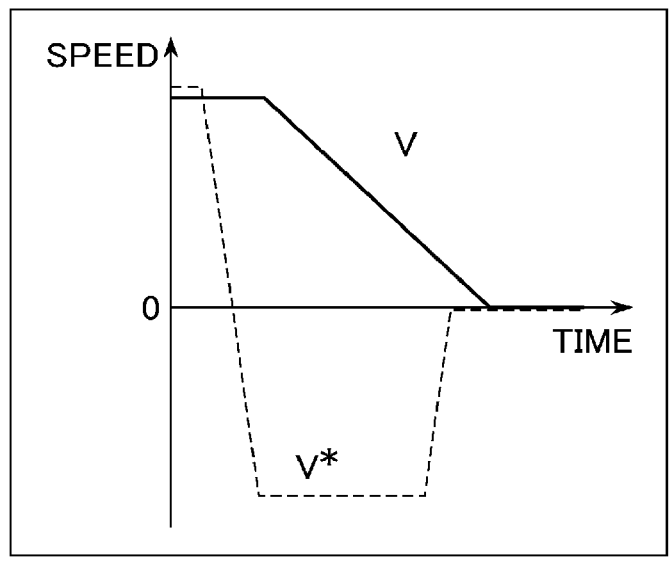
FIG. 7D is a graph showing an exemplary relation between the speed command V* and the actual speed V.

FIGS. 7C and 7D show operations from swing to stop. In FIG. 7C, the operator places the operating lever of the operating device 4b back in the neutral position to make the speed command zero, thereby bringing the upper swing structure 1d to a stop. In this case, the electric motor 16 is decelerated normally; and neither the first condition nor the second condition is satisfied, so that the fault determining unit 65 does not determine a fault. FIG. 7D shows an operation in which the operator operates the lever in a backward rotation direction to thereby bring the upper swing structure 1d to a stop. In this case, the speed command and the actual speed are reverse in polarity and a condition in which the speed difference is excessively great continues to exist; however, the operation is still normal. In this case, the sign of the value of the target speed V* from which the actual speed V is subtracted is "negative" and the sign of the acceleration dV/dt is also "negative." Thus, the first condition is not satisfied. While the difference between the target speed V* and the actual speed V is greater than the first reference value Vth, the acceleration dV/dt is smaller than the second reference value βth as in the case of FIG. 7C depicting a normal condition, so that the second condition is not satisfied, either. Thus, the embodiment can determine such a case to be normal without making any false determination.

In the hydraulic excavator having the arrangements as described above, erroneous determination relating to the determination of faults in the electronic control system can be prevented, which improves availability of the hydraulic excavator and work efficiency. Additionally, failure of detection relating to the determination of faults can also be prevented, which improves reliability.

In the above-described embodiment, the fault determining process is performed by using the speed (the speed command V* and the actual speed V) of the electric motor 16. A process similar to that mentioned above can also be performed by using torque of the electric motor 16 (the torque command output from the speed control unit 60 and the actual torque calculated from the output of the current sensor 30). Determination accuracy tends to be reduced with a considerable difference between the speed command V* and the actual speed V. The performance of the fault determining process based on the torque as described above can, however, prevent the determination accuracy from being reduced.

The above embodiment has been described for a case in which the fault determining process is performed in the main microprocessor 31. The speed calculating unit 64 and the fault determining unit 65 may nonetheless be mounted on the monitoring microprocessor 32 to enable the monitoring microprocessor 32 to perform the similar fault determining process function. Similarly to the main microprocessor 31, the monitoring microprocessor 32 receives the speed command V* from the communication line L2 and inputs of signals from the position sensor 24 and the current sensor 30. Thus, the fault determining process described with reference to FIG. 6 may be performed using the pieces of information mentioned above and the speed calculating unit 64 and the fault determining unit 65. When a fault is detected, the monitoring microprocessor 32 outputs a gate off signal to the IGBT 32 and a braking signal to the swing emergency brake 25. This enables the monitoring microprocessor 32 to stop the swing motion of the upper swing structure 1d, even if, for example, a fault occurs in the main microprocessor 31 and illegal motor control is performed. It is noted that the monitoring microprocessor 32 does not need to perform the motor control and is thus not required to offer calculation performance as high as that of the main microprocessor 31, so that an inexpensive microprocessor may be used for the monitoring microprocessor 32. Understandably, the monitoring microprocessor 32 may be omitted, if the motor control and the fault determining process are performed only by the main microprocessor 31 as in the above-described embodiment.

Another possible arrangement for monitoring the status of the main microprocessor 31 is, in addition to causing the monitoring microprocessor 32 to perform the above process with the monitoring microprocessor 32 and the main microprocessor 31 connected to each other so as to permit communications therebetween, to combine with the foregoing an example calculation system in which the monitoring microprocessor 32 sets an appropriate problem to the main microprocessor 31 and, based on the answer to the problem from the main microprocessor 31, diagnoses the main microprocessor 31. An exemplary method of this kind is to cause the main microprocessor 31 to perform an arithmetic operation at appropriate intervals and the monitoring microprocessor 32 determines whether a result of the operation is right or wrong to thereby diagnose the status of the main microprocessor 31.

Additionally, the above embodiment has been described for a case in which the communication driver 33b is mounted so as to allow the monitoring microprocessor 32 to perform a communication function and to receive the speed command V* directly from the first controller 11. The use of the communication driver 33b can, however, be omitted, if the speed command V* is to be received by way of the main microprocessor 31, which allows the system to be configured at lower cost. In a configuration such as that described above, preferably, the first controller 11 transmits the speed command V* with a check code or a serial number appended to it in advance, in order to prevent a situation from occurring in which the monitoring microprocessor 32 receives a false command value when the main microprocessor 31 is faulty and is thus unable to detect the fault in the main microprocessor 31. If the main microprocessor 31 transmits the data directly without its being processed to the monitoring microprocessor 32, the monitoring microprocessor 32 can determine that the command value has not been falsified due to a fault in the main microprocessor 31.

Fault detection of the first controller 11 and the second controller 22 can be achieved by mutual monitoring by the first controller 11 and the second controller 22, in addition to the embodiment described above. Specific examples of mutual monitoring by the first controller 11 and the second controller 22 include the example calculation system described earlier and checking that an alive counter (a counter that is incremented at every communication cycle and reset when a predetermined value is reached) is updated.

The arrangements of the hydraulic excavator as those described above can achieve safety of the electronic control system relating to the upper swing structure 1d at low cost without permitting redundancy in each of the controllers, even when any of the position sensor 24, the controllers 11, 12, the inverter device 13, and the electric motor 16 is faulty. In addition, the output from the second hydraulic sensor 21 as one of the redundant hydraulic sensors is applied to the inverter device 13. This achieves another effect of the present invention to improve availability of the hydraulic excavator, because a swing motion can continue even when the first controller 11 that calculates the swing command or the communication line L2 between the first controller 11 and the inverter device 13 is faulty.

The embodiment described above incorporates a crawler type hydraulic excavator as an example of the construction machine. The present invention is nonetheless similarly applicable to any other type of construction machine that includes an upper swing structure swingably driven an electric motor (e.g., a wheel type hydraulic excavator and a crawler type or wheel type crane).

DESCRIPTION OF REFERENCE NUMERALS

1A Front implement
1B Vehicle body
1a Boom
1b Arm
1c Bucket
1d Upper swing structure
1e Lower track structure
3a Boom cylinder
3b Arm cylinder
3c Bucket cylinder
3e Left-side track motor
3f Right-side track motor
4a, 4b Operating device
5a to 5f Spool type directional control valve
6 Hydraulic pump
7 Engine
8 Relief valve
9 Hydraulic fluid tank
10 Driving power conversion machine
11 First controller
12, 13 Inverter device
14 Chopper
15 Electric energy storage device
16 Electric motor (swing motor)
20 First hydraulic sensor
20a First hydraulic sensor (left side)
20b First hydraulic sensor (right side)
21 Second hydraulic sensor
21a Second hydraulic sensor (left side)
21b Second hydraulic sensor (right side)
22 Second controller
23 IGBT (inverter circuit)
24 Position sensor
25 Swing emergency brake
26 Display device
30 Current sensor
31 Main microprocessor
32 Monitoring microprocessor
33a, 33b Communication driver
60 Speed control unit
61 Torque control unit
64 Speed calculating unit
65 Fault determining unit
80 Backward rotation detecting unit
81 Overspeed detecting unit
82 Acceleration calculating unit
L1 DC electric power line
L2 Communication line

The invention claimed is:

1. A construction machine comprising:
a swing structure;
an electric motor that swingably drives the swing structure;
an operating device that outputs operating signals for instructing the swing structure to swing in a clockwise direction or a counterclockwise direction and stop according to an operating amount and an operating direction; and
a control device configured to calculate a target speed of the electric motor from an actual speed of the electric motor and the operating signal output from the operating device, and to control the electric motor based on a control signal generated based on the target speed, wherein the control device determines whether a sign of a value computed by subtracting the actual speed from a target speed of the electric motor, a target speed defined by the control signal, is different from a sign of acceleration of the electric motor, and determines a fault occurred in an electronic control system relating to the electric motor based on the determination result regarding the signs; a braking device that brakes the electric motor based on a braking signal, wherein the control device outputs the braking signal to the braking device when the sign of a value computed by subtracting the actual speed from the target speed of the electric motor is different from the sign of acceleration of the electric motor.

2. The construction machine according to claim 1, further comprising:

an annunciating device that annunciates occurrence of a fault in the construction machine based on an annunciation signal, wherein the control device outputs the annunciation signal to the annunciating device when the sign of a value computed by subtracting the actual speed from the target speed of the electric motor is different from the sign of acceleration of the electric motor.

3. The construction machine according to claim 1, further comprising:

acceleration detecting means that detects acceleration of the electric motor.

4. The construction machine according to claim 1, wherein the acceleration of the electric motor is calculated based on target torque of the electric motor defined by the control signal or actual torque generated by the electric motor.

5. The construction machine according to claim 1, further comprising:

another control device configure to determine whether the sign of a value computed by subtracting the actual speed from the target speed of the electric motor is different from the sign of acceleration of the electric motor, and to determine a fault occurred in the electronic control system relating to the electric motor based on the determination result regarding the signs.

* * * * *